United States Patent [19]
Wang

[11] Patent Number: 5,837,981
[45] Date of Patent: Nov. 17, 1998

[54] SIGNAL OUTPUTTING DEVICE OF OPTICAL RULER

[76] Inventor: Chin-Yuan Wang, P. O. Box 2103, Taichung, Taiwan

[21] Appl. No.: 899,705

[22] Filed: Jul. 24, 1997

[51] Int. Cl.$^6$ .................................................... G06G 1/02
[52] U.S. Cl. ........................... 235/70 R; 33/707; 33/710; 33/712
[58] Field of Search .............................. 33/707, 710, 712, 33/70 R

[56] References Cited

U.S. PATENT DOCUMENTS

| | | | |
|---|---|---|---|
| 3,852,739 | 12/1974 | Mohr, III | 33/125 |
| 4,169,316 | 10/1979 | Ernst | 33/125 |
| 4,295,742 | 10/1981 | Nelle et al. | 33/125 |
| 4,550,505 | 11/1985 | Rieder et al. | 33/125 |
| 4,631,403 | 12/1986 | Rieder et al. | 33/125 |
| 5,099,583 | 3/1992 | Heinz et el. | 33/707 |
| 5,115,573 | 5/1992 | Rieder et al. | 33/706 |
| 5,258,931 | 11/1993 | Hassler, Jr. | 33/707 |
| 5,383,284 | 1/1995 | Rieder | 33/706 |
| 5,664,336 | 9/1997 | Zanier et al. | 33/706 |

*Primary Examiner*—Anita Pellman Gross
*Assistant Examiner*—Diane I. Lee

[57] ABSTRACT

A signal outputting device of optical ruler is disclosed. It includes a first guide seat formed with an internal axial chamber for receiving a reflecting plate therein, a second guide seat including a slide block axially movable within the chamber and a resilient lever having a fixed end disposed on the slide block, and a sensor disposed on outer side of the slide block. An inner side of the sensor abuts against a free end of the resilient lever. The slide block is disposed with two first stopper sections spaced from each other by a certain distance. The sensor is positioned between the first stopper sections. A section of the sensor, which contacts with the free end of the resilient lever, is formed with a guide channel axially parallel to the moving direction of the slide block. In the case of change of the distance between the first and second guide seats, the accuracy of the optical ruler for measuring length will not be affected.

1 Claim, 4 Drawing Sheets

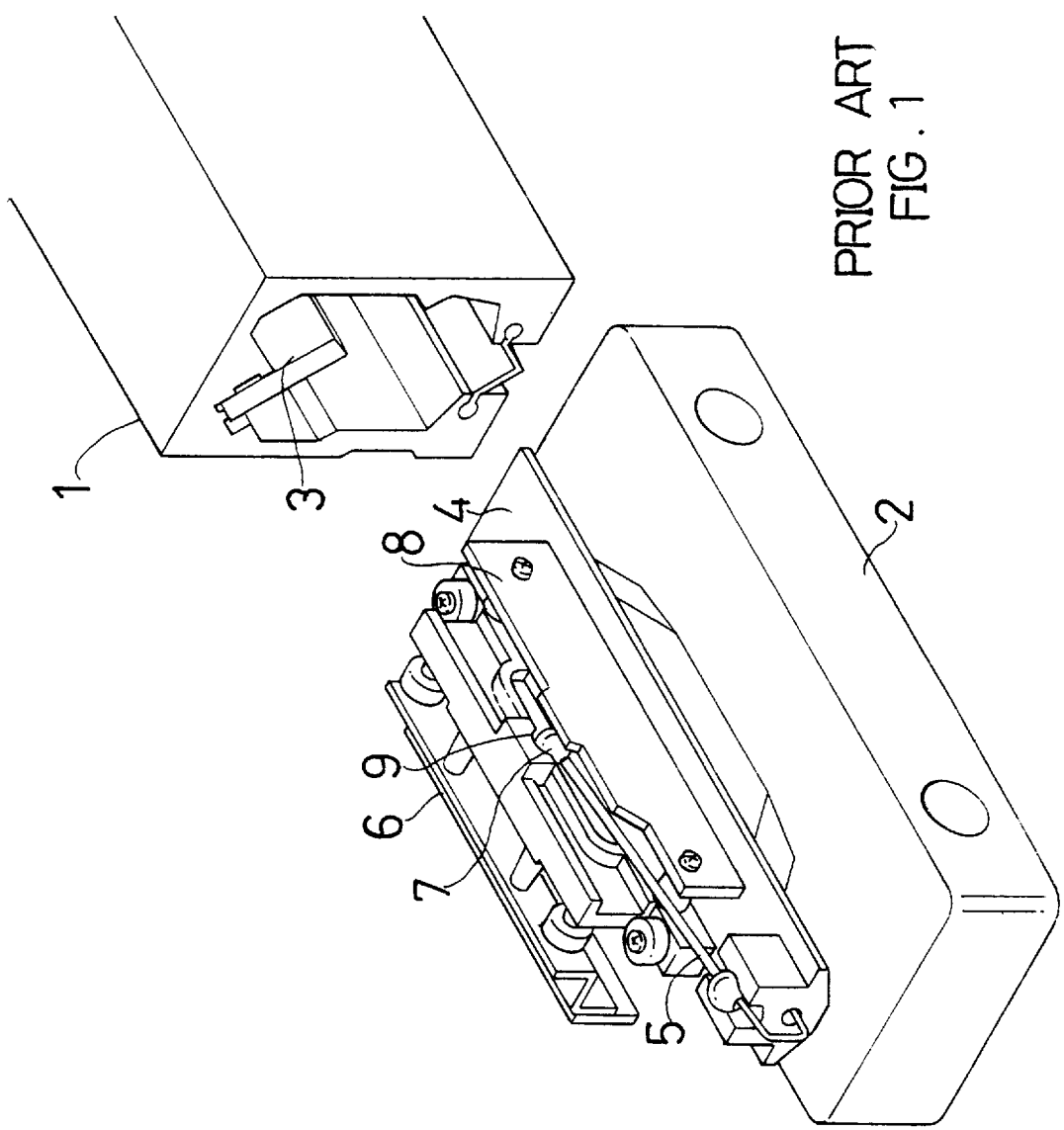

SIGNAL OUTPUTTING DEVICE OF OPTICAL RULER

BACKGROUND OF THE INVENTION

The present invention relates to a signal output g device of optical ruler. After installed on a working bench and in the case of deformation of the working bench, the accuracy of the optical ruler for measuring length will not be affected.

FIGS. 1 and 2 show a conventional optical ruler composed of a first and a second guide seats 1, 2 which are movable relative to each other. The first guide seat 1 can be fixed on a working bench (not shown) of an automatized working machine. The first guide seat 1 is formed with a chamber for receiving therein a reflecting plate 3. The second guide seat 2 is fixed on a machine base (not shown) of the working machine and disposed with a slide block 4. The slide block 4 is inserted in the first guide seat 1 and slidable within the first guide seat 1 when the first guide seat 1 is moved along with the working bench. A sensor 6 is disposed on the slide block 4 and pushed by a resilient lever 5 to abut against the reflecting plate 3. By means of changing the position of the sensor 6 relative to the reflecting plate 3, a signal is outputted to a display (not shown) of the working machine for indicating the displacement.

One end of the resilient lever 5 is fixed on the slide block 4, while the other end thereof inclined outward extends and is equipped with a steel ball 7 at the end. A cavity 9 is formed on a central portion of lower side of a base 8 of the sensor 6, whereby the steel ball 7 can be rotatably fitted in the cavity 9. In use, the resilient lever 5 exerts a resilient force onto the sensor 6, making the same lean against the reflecting plate 3. However, once the working bench on which the first guide seat 1 is fixed is worn and deformed after a period of use to change the distance between the first and second guide seats 1, 2, as shown in FIG. 2C, the distance D between the sensor 6 and the slide block 4 will be changed as well. Also, the resilient lever 5 will be slightly swung. This will not only lead to a change of longitudinal distance D of the sensor 6 relative to the slide block 4, but also lead to a transverse displacement L of the sensor 6 by the resilient lever 5. Therefore, the accuracy of the optical ruler for measuring will be affected.

SUMMARY OF THE INVENTION

It is therefore a primary object of the present invention to provide a signal outputting device of optical ruler, which is able to minimize the affection on the accuracy of the optical ruler by the longitudinal deformation of the working bench.

The present invention can be best understood through the following description and accompanying drawings, wherein:

BRIEF DESCRIPTION OF THE DRAWINGS

FIG. 1 is a perspective view of a conventional optical ruler;

DETAILED DESCRIPTION OF THE PREFERRED EMBODIMENT

Figure 2B:
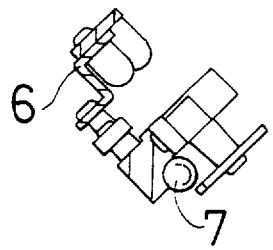
Fig. 2B is a sectional view taken along line 2B—2B of FIG. 2A.
Figure 2A:
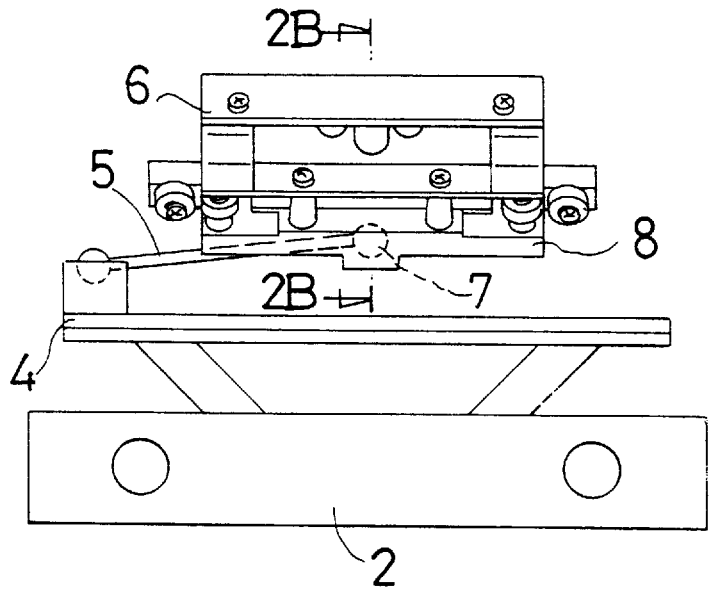
FIG. 2A is a front view of the second guide seat of the conventional optical ruler.
Figure 2C:
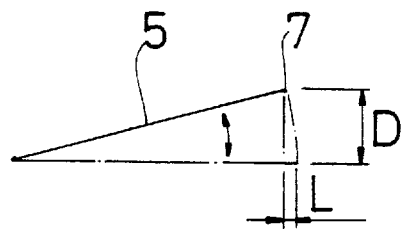
FIG. 2C shows the displacement of the resilient lever of the conventional optical ruler.
Figure 3:
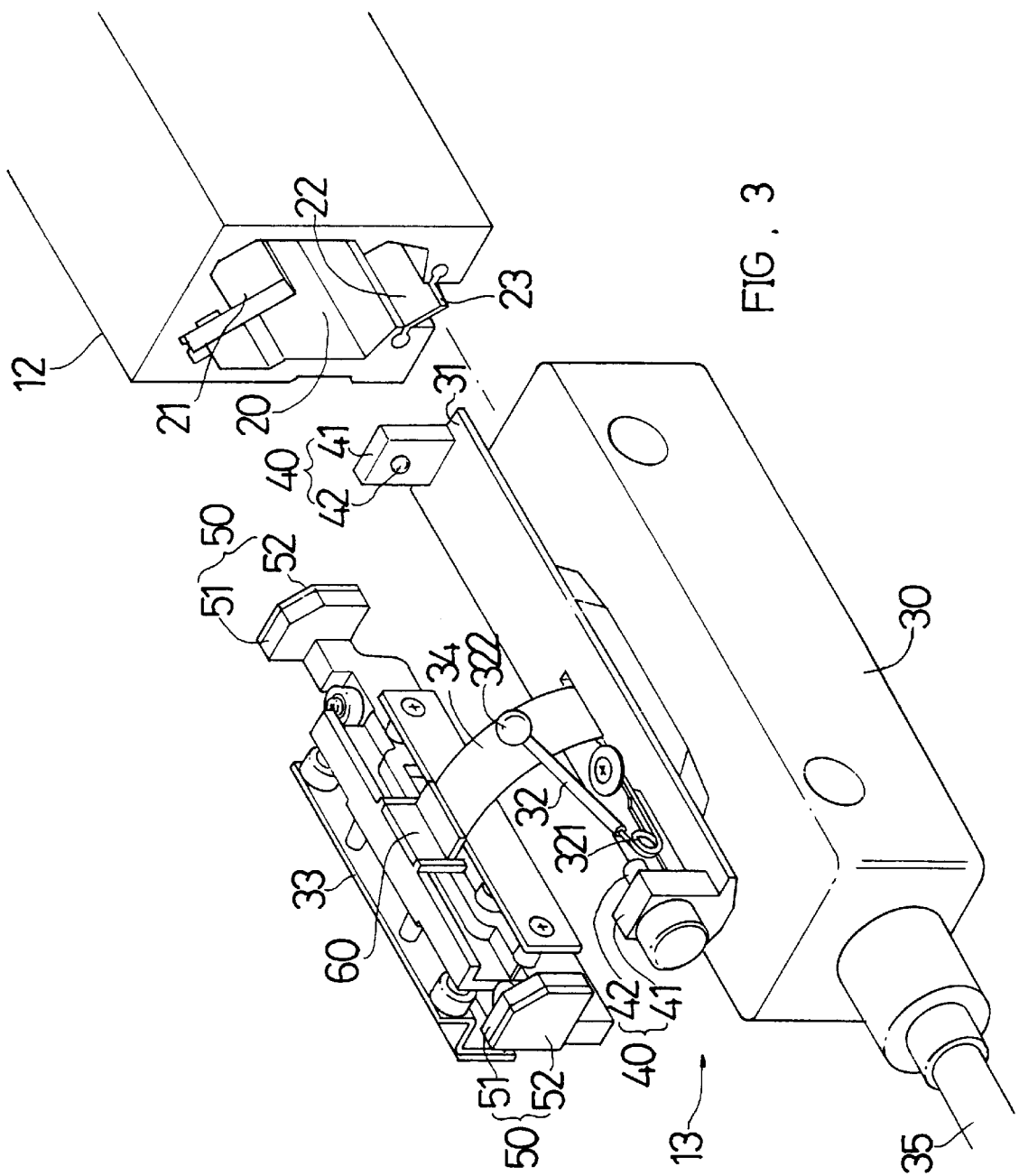
FIG. 3 is a perspective exploded view of the present invention.
Figure 4:
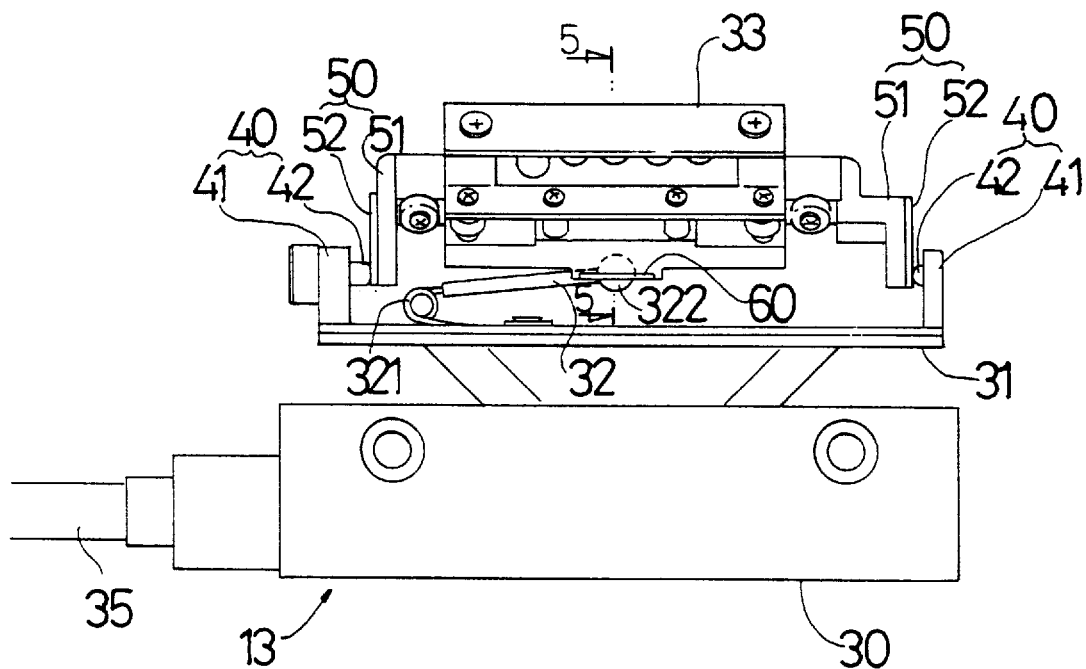
FIG. 4 is a front view of the sensor of the present invention.
Figure 5:
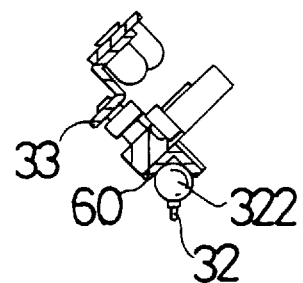
FIG. 5 is a sectional view taken along line 5—5 of FIG. 4.

Please refer to FIGS. 3 to 5. The present invention includes a first guide seat 12 and a second guide seat 13.

The first guide seat 12 is made of an aluminum squeezed material with a certain length and shape of cross-section. The interior of the first guide seat 12 is formed with an axially extending chamber 20 for receiving a reflecting plate 21. An elongated channel 22 axially extends through the first guide seat 12 to communicate the outer edge thereof and the chamber 20. A pair of flexible plates 23 are disposed on two sides of the elongated channel 22 for preventing dusts from entering the chamber 20.

The second guide seat 13 includes a fixing block 30 disposed on a working bench (not shown), a slide block 31 disposed on one side of the fixing block 30 and axially reciprocally movable along the elongated channel 22 within the chamber 20, a resilient lever 32 having a fixed end 321 disposed on the slide block 31, and a sensor 33 disposed on outer side of the slide block 31. A central section of inner side of the sensor 33 abuts against a ball-like free end 322 of the resilient lever 32. The sensor is disposed with several wires 34 connected with a signal cable 35 disposed on the slide block 31. Each end of the slide block 31 is disposed with a first stopper section 40 including a first stopper block 41 projecting from each end of the slide block 31 and an engaging member 42 extending from the first stopper block 41 opposite to the other.

The sensor 33 is clamped between the first stopper sections 40 corresponding to the slide block 31 and disposed with two second stopper sections 50 respectively corresponding to the first stopper sections 40. Each second stopper section 50 includes a second stopper block 51 projecting from each end of the sensor 33 and a plane face 52 facing the engaging member 42. The plane face 52 is perpendicular to the sliding direction of the slide block 31.

A section of the sensor 33, which abuts against the free end 322 of the resilient lever, is disposed with a guide channel 60. The direction of a long axis of the guide channel 60 is perpendicular to the plane face 52. The guide channel 60 has a V-shaped cross-section, whereby the free end 322 of the resilient lever 32 can reciprocally move along the long axis without dropping out from two ends thereof.

The end of the engaging member 42 has a semicircular or arch shape and abuts against the plane face 52.

One of the engaging members 42 is pushed by a spring (not shown) and axially reciprocally movable, whereby the second stopper blocks 51 of the sensor 33 are positioned between the first stopper blocks 41.

According to the above arrangement, in the case that the working bench is deformed to change the distance between the first and second guides 12, 13 and even that the resilient lever 32 is forced to slightly swing, since the free end 322 thereof is freely slidable along inner side of the sensor 33 and the sensor 33 is restricted between the first stopper sections 40 and is only movable in a direction perpendicular to the sliding direction of the slide block 31, the swinging of the resilient lever 32 will not lead to a transverse displacement of the sensor 33. Therefore, the accuracy of the optical ruler for measuring distance can be maintained.

Moreover, the semicircular or arch end of the engaging member 42 contacts with the plane face 52 of the sensor 33 at a point, whereby the sensor 33 can more freely move without deflection or clog.

It is to be understood that the above description and drawings are only used for illustrating one embodiment of the present invention, not intended to limit the scope thereof. Any variation and derivation from the above description and drawings should be included in the scope of the present invention.

What is claimed is:

1. A signal outputting device of optical ruler, comprising:

a first guide seat formed with an internal axial chamber, a reflecting plate being disposed in the chamber, an elongated channel axially extending through the first guide seat to communicate the chamber with an outer edge of the first guide seat;

a second guide seat including a slide block axially movable within the chamber and a resilient lever having a fixed end disposed on the slide block; and a sensor disposed on outer side of the slide block, an inner side of the sensor abutting against a free end of the resilient lever, wherein the slide block is disposed with two first stopper sections spaced from each other by a certain distance, each first stopper section having a first stopper block and an engaging member disposed thereon, a rear end of each engaging member having an arch shape, one of the engaging members being pushed by a resilient member, the sensor being positioned between the first stopper sections and disposed with two second stopper sections spaced from each other by a certain distance, each second stopper section being disposed with a plane face abutting against the rear end of the engaging member, the second stopper sections being such restricted by the first stopper sections as to only move in a direction perpendicular to the moving direction of the slide block, a section of the sensor contacting with the free end of the resilient lever being formed with a guide channel axially parallel to the moving direction of the slide block; and wherein the plane face is perpendicular to the moving direction of the slide block.

* * * * *